US009860412B2

United States Patent
Matsuzawa

(10) Patent No.: US 9,860,412 B2
(45) Date of Patent: Jan. 2, 2018

(54) IMAGE PROCESSING APPARATUS, AUDIO RECORDING METHOD, AND RECORDING MEDIUM STORING AN AUDIO RECORDING PROGRAM

(71) Applicant: Junji Matsuzawa, Kanagawa (JP)

(72) Inventor: Junji Matsuzawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 34 days.

(21) Appl. No.: 14/947,063

(22) Filed: Nov. 20, 2015

(65) Prior Publication Data

US 2016/0165090 A1 Jun. 9, 2016

(30) Foreign Application Priority Data

Dec. 4, 2014 (JP) ................................. 2014-246036

(51) Int. Cl.
| | |
|---|---|
| *G06F 3/12* | (2006.01) |
| *H04N 1/60* | (2006.01) |
| *H04N 1/32* | (2006.01) |
| *H04N 1/00* | (2006.01) |
| *G10K 11/178* | (2006.01) |
| *G03G 15/04* | (2006.01) |
| *G03G 15/00* | (2006.01) |

(52) U.S. Cl.
CPC ... *H04N 1/32128* (2013.01); *G03G 15/04018* (2013.01); *G03G 15/50* (2013.01); *G10K 11/178* (2013.01); *H04N 1/00403* (2013.01); *G03G 2215/00637* (2013.01); *G10K 2210/1052* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS

| | | | | | |
|---|---|---|---|---|---|
| 5,356,296 | A | * | 10/1994 | Pierce | A63H 33/38 434/317 |
| 5,636,292 | A | * | 6/1997 | Rhoads | G06Q 20/341 235/382 |
| 5,644,557 | A | * | 7/1997 | Akamine | G03B 17/24 369/14 |
| 5,666,168 | A | * | 9/1997 | Montgomery | H04N 1/00098 348/463 |
| 5,784,670 | A | * | 7/1998 | Sasahara | B41J 29/38 381/73.1 |

(Continued)

FOREIGN PATENT DOCUMENTS

| | | |
|---|---|---|
| JP | 4-343561 | 11/1992 |
| JP | 4-355797 | 12/1992 |

(Continued)

*Primary Examiner* — Madelein Nguyen
(74) *Attorney, Agent, or Firm* — Harness, Dickey & Pierce, P.L.C.

(57) ABSTRACT

An image processing apparatus includes circuitry configured to obtain audio data of audio collected through a microphone, determine whether the audio data has a noise level equal to or less than a threshold to generate a determination result, record the audio data when the determination result indicates that the noise level of the audio data is equal to or less than the threshold, and add the recorded audio data to image data.

16 Claims, 6 Drawing Sheets

(56) References Cited

U.S. PATENT DOCUMENTS

| | | | | |
|---|---|---|---|---|
| 5,805,714 A * | 9/1998 | Kasama | | G10K 11/178 381/71.1 |
| 5,838,383 A * | 11/1998 | Chimoto | | H04L 27/00 348/553 |
| 6,262,749 B1 * | 7/2001 | Finger | | G01S 7/52023 128/916 |
| 6,377,309 B1 * | 4/2002 | Ito | | H04N 21/23431 348/554 |
| 6,594,688 B2 * | 7/2003 | Ludwig | | G06Q 10/10 370/286 |
| 6,687,383 B1 * | 2/2004 | Kanevsky | | G10L 19/018 380/210 |
| 6,721,465 B1 * | 4/2004 | Nakashima | | G06K 9/20 358/474 |
| 6,757,406 B2 * | 6/2004 | Rhoads | | G06Q 20/1235 358/3.28 |
| 6,862,417 B2 * | 3/2005 | Tsunoda | | G03G 21/20 381/94.1 |
| 7,916,354 B2 * | 3/2011 | Rhoads | | G06T 1/005 283/93 |
| 7,945,142 B2 * | 5/2011 | Finkelstein | | G11B 27/28 386/285 |
| 9,094,576 B1 * | 7/2015 | Karakotsios | | H04N 7/157 |
| 2002/0118948 A1 * | 8/2002 | Jones | | G11B 23/40 386/352 |
| 2002/0180586 A1 * | 12/2002 | Kitson | | G06F 21/32 340/5.82 |
| 2004/0003040 A1 * | 1/2004 | Beavers | | H04N 7/15 709/204 |
| 2004/0120018 A1 * | 6/2004 | Hu | | H04N 1/00127 358/506 |
| 2005/0012771 A1 * | 1/2005 | Leung | | B41J 11/008 347/19 |
| 2005/0143136 A1 * | 6/2005 | Lev | | H04L 29/06 455/566 |
| 2005/0200709 A1 * | 9/2005 | Lee | | H04N 5/772 348/207.99 |
| 2006/0037055 A1 * | 2/2006 | Hashimoto | | G11B 20/00086 725/86 |
| 2006/0149558 A1 * | 7/2006 | Kahn | | G10L 15/063 704/278 |
| 2007/0127879 A1 * | 6/2007 | Frank | | H03G 3/32 386/234 |
| 2008/0297589 A1 * | 12/2008 | Kurtz | | H04N 7/147 348/14.16 |
| 2009/0054768 A1 * | 2/2009 | Halmann | | A61B 8/468 600/437 |
| 2011/0115878 A1 * | 5/2011 | Noteware | | H04N 7/15 348/14.12 |
| 2012/0081567 A1 * | 4/2012 | Cote | | H04N 21/41407 348/222.1 |
| 2012/0288114 A1 * | 11/2012 | Duraiswami | | H04R 1/406 381/92 |
| 2013/0070093 A1 * | 3/2013 | Rivera | | G11B 27/002 348/143 |
| 2013/0163778 A1 * | 6/2013 | Ito | | G10K 11/175 381/73.1 |
| 2013/0163779 A1 * | 6/2013 | Yamaguchi | | G10K 11/175 381/73.1 |
| 2013/0293747 A1 * | 11/2013 | Yoshizuka | | G10L 21/0232 348/241 |
| 2014/0079248 A1 * | 3/2014 | Short | | G10L 21/0272 381/119 |
| 2014/0164927 A1 * | 6/2014 | Salaverry | | H04N 1/2112 715/727 |
| 2015/0146228 A1 * | 5/2015 | Matsuzawa | | H04N 1/0092 358/1.13 |
| 2015/0188956 A1 * | 7/2015 | Chauhan | | G06Q 30/016 726/7 |

FOREIGN PATENT DOCUMENTS

| | | |
|---|---|---|
| JP | 2006-262241 | 9/2006 |
| JP | 2007-052272 | 3/2007 |
| JP | 2008-306294 | 12/2008 |

* cited by examiner

IMAGE PROCESSING APPARATUS, AUDIO RECORDING METHOD, AND RECORDING MEDIUM STORING AN AUDIO RECORDING PROGRAM

CROSS-REFERENCE TO RELATED APPLICATION

This patent application is based on and claims priority pursuant to 35 U.S.C. §119(a) to Japanese Patent Application No. 2014-246036, filed on Dec. 4, 2014 in the Japan Patent Office, the entire disclosure of which is hereby incorporated by reference herein.

BACKGROUND

Technical Field

The present invention relates to an image processing apparatus, an audio recording method, and a non-transitory recording medium storing an audio recording program.

Background Art

Image forming apparatuses that collect sound from a sound input unit such as a microphone, digitize it into audio data, add the audio data into image data to output the image data with the audio data to other apparatuses via a network or store the audio data in a recording medium are appearing recently.

In these image forming apparatuses, audio data is usually used for adding information to image data such as descriptions of image data, and it is usual to sample sound during scanning image data. However, if the image forming apparatus is operating, operating noise and surrounding noise are mixed into the sampled sound, degrading clarity of the audio data.

To cope with issue, a facsimile machine that stops operating the mechanical system during recording audio and starts operating the mechanical system after finishing recording audio is known. In the known technology, in the facsimile machine that includes a sound recording/playing unit, an output unit that scans documents, a controller that controls turning the cooling fan on and off, and a storing unit that stores received data, if the facsimile machine is in idle state, the fan is turned off, it is stopped scanning documents, and the received data is stored in the storing unit if the received data exists. Subsequently, the fan is turned on after finishing recording sound, it is started to scan documents again, and the stored received data is output.

That is, in the known technology, the data output unit, the scanning unit, and the mechanical unit such as the fan are stopped operating in recording sound, and the operation prohibition is released after finishing recording sound to suppresses the operating noise of the mechanical system from getting mixed in the recorded sound.

SUMMARY

Example embodiments of the present invention provide a novel image processing apparatus that includes circuitry configured to obtain audio data of audio collected through a microphone, determine whether the audio data has a noise level equal to or less than a threshold to generate a determination result, record the audio data when the determination result indicates that the noise level of the audio data is equal to or less than the threshold, and add the recorded audio data to image data.

Further example embodiments of the present invention provide a method of recording audio and a non-transitory recording medium storing an audio recording program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
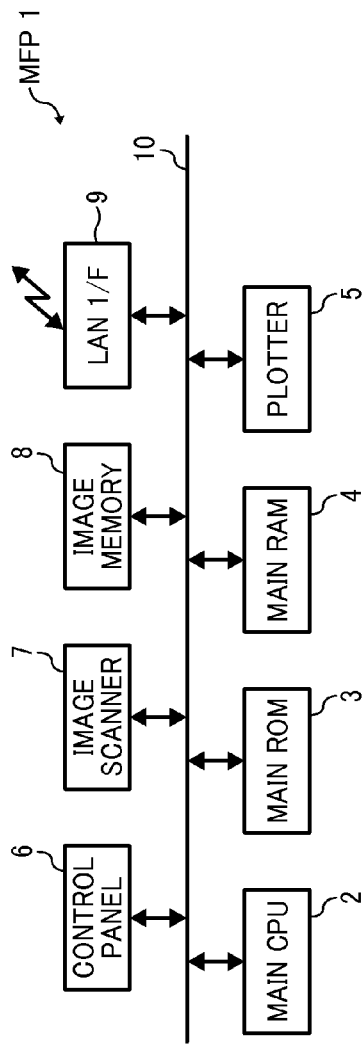
FIG. 1 is a block diagram illustrating a configuration of a MFP as a first embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the embodiments described below, a novel image processing apparatus that ensures efficiency of the image processing operation and suppresses operating noise from getting mixed in sampling audio is provided.

First Embodiment

A first embodiment is described below with reference to FIGS. 1 to 3. FIG. 1 is a block diagram illustrating a configuration of a MFP in the first embodiment.

In FIG. 1, a multifunction peripheral (MFP) (an image forming apparatus) 1 includes a main Central Processing Unit (CPU) 2, a main Read Only Memory (ROM) 3, a main Random Access Memory (RAM) 4, a plotter 5, a control panel 6, an image scanner 7, an image memory 8, and a Local Area Network (LAN) interface (I/F) 9 etc., which are connected with each other via a bus 10.

In the main ROM 3, an operating system for the MFP 1 as the image forming apparatus, an audio recording program that controls recording audio in this embodiment, and desired system data are stored.

The main CPU 2 uses the main RAM as a work memory, controls entire MFP 1 to execute basic processes as the MFP 1, and executes an audio recording method to control recording audio in this embodiment.

That is, by reading the audio recording program that executes the image processing method in this embodiment stored in computer-readable media such as the ROM, an Electrically Erasable and Programmable Read Only Memory (EEPROM), an EPROM, a flash memory, a flexible disk, a Compact Disc Read Only Memory (CD-ROM), a Compact Disc Rewritable (CD-RW), a Digital Versatile Disk (DVD), a Secure Digital (SD) card, and a Magneto-Optical (MO) disc etc. and installing the audio recording program in the mROM 3, the MFP 1 is constructed as the image forming apparatus that executes the audio recording method improving efficiency of an image processing operation (described later) and suppressing operating noise from getting mixed in sampling audio. The audio recording program is a computer-executable program written in legacy programming languages and object-oriented programming languages such as assembler, C, C++, C#, and Java etc., and the audio recording program can be distributed by storing in the recording medium described above.

That is, the main CPU 2 executes a data editing process that adds audio data to image data and a control process that performs the audio recording operation only if noise included in the audio data is equal to or less than a predetermined threshold.

A plotter using various printing method can be used as the plotter 5. For example, a plotter that records and outputs an image on paper (recording medium) using electrophotographic method is used for the plotter 5. In addition, the plotter 5 can be either a single-sided printer that forms an image on one surface of the paper or a double-sided plotter that forms images on both surfaces of the paper. Furthermore, the plotter 5 can include a post-processing unit that performs post-processing such as punching, folding, and stapling etc. That is, the plotter 5 performs a recording process that records and outputs an image on paper as the recording medium.

For example, an image scanner etc. that uses a Charge Coupled Device (CCD) or Complementary Metal Oxide Semiconductor (CMOS) is used as the image scanner 7. Usually, the image scanner 7 includes an Automatic Document Feeder (ADF). Multiple sheets of document is set on a document tray on the ADF, and the ADF transfers the document set on the document tray to a contact glass where document is scanned in an image scanner 7 one by one. The image scanner 7 scans the document transferred by the ADF or set on the contact glass to scan the image on the document at a predetermined resolution and output it as analog image data. The image scanner 7 includes an analog/digital (A/D) converter to convert analog image data into digital image data and output it to the main CPU 2. It should be noted that the image scanner 7 can be a color scanner that scans a color document. In addition, in the ADF, a document sensor that detects an amount of the document set on the document tray is disposed.

The RAM and/or the hard disk etc. are used as the image memory 8 that stores image data of the document scanned by the image scanner 7 and image data received by the LAN I/F 9 under the control of the main CPU 2.

The main CPU 2 reads the image data stored in the image memory 8, transfers the read image data to a user terminal on the network via the LAN I/F 9 or output using the plotter 5. In this case, the main CPU 2 converts the image data to have a format such as Tag Image File Format (TIFF), Joint Photographic Experts Group (JPEG), or Portable Document Format (PDF) to store the converted image data in the image memory 8.

The LAN I/F 9 is connected to a Local Area Network (LAN) for example. In addition, in this embodiment, the LAN I/F 9 is connected to other networks via a communication channel connected to the network. The LAN I/F 9 exchanges the image data and e-mail with terminals on the network and terminals (devices) on the other networks, e.g., personal computers and workstation etc. Especially the LAN I/F 9 transfers the image data that audio data is added. Any other data output interface may be used in alternative to the LAN I/F 9 as long as it has a function that can output the image data that audio data is added. For example, the data output interface can store the data in an external memory or an internal memory.

Figure 2:
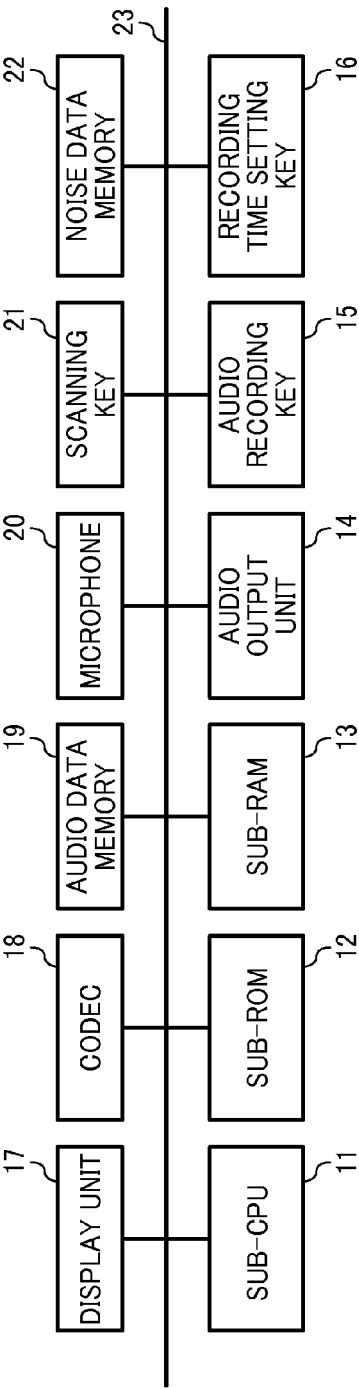
FIG. 2 is a block diagram illustrating a configuration of a control panel as the first embodiment of the present invention.

As shown in FIG. 2, the control panel 6 includes a sub-CPU 11, a sub-ROM 12, a sub-RAM 13, an audio output unit 14, an audio recording key 15, a recording time setting key 16, a display 17, a COmpressor/DECompressor (CODEC) 18, an audio data memory 19, a microphone 20, a scanning key 21, and a noise data memory 22 etc.

The sub-ROM 12 stores a program for the control panel 6, a part of program that the control panel 6 executes among the audio recording programs in this embodiment, and system data.

The sub-CPU 11 performs processes as the control panel 6 by controlling entire control panel 6 using the sub-RAM 13 as a work memory based on the program stored in the sub-ROM 12. More specifically, the sub-CPU 11 controls audio recording processes on the control panel 6 in this embodiment including an audio sampling process and an audio recording process using the microphone under the control of the main CPU 2.

For example, the audio output unit 14 may be implemented by a speaker and an audio output circuit etc. and amplifies the audio data to output it as audio.

The audio recording key 15, when selected by a user, starts recording audio and outputs operational information to the sub-CPU 11.

The recording time setting key 16 allows the user to configure recording time. For example, the recording time can be configured in units of a second. That is, the configuration of the recording time is not limited to setting arbitrary time in units of a second. For example, a number of recording times are registered in the sub-ROM 12 preliminarily, and it is possible to select the recording time used for recording audio among the multiple number of recording times.

For example, a crystal liquid display is used for the display 17, and the display 17 displays display data under the control of the sub-CPU 11. Especially, the display 17 displays various information desired for the image processing along with recording audio in this embodiment under the control of the sub-CPU 11.

The CODEC 18 controls compressing/expanding audio data under the control of the sub-CPU 11. For example, the CODEC 18 converts the audio data into digital data such as WAVe sound (WAV) and MPEG audio layer 3 (MP3).

The audio data memory (audio memory) 19 stores the audio sampled using the microphone 20 and the audio data compressed/expanded by the CODEC 18.

The microphone (audio collecting unit) 20 includes the microphone and an amplifier circuit to collect external audio, especially an operator's voice, and output the audio data.

The scanning key 21 is used by the user for commanding the image scanner 7 to start scanning the document. In addition, the control panel 6 includes a printing key etc. to command the plotter 5 to start recording an image on paper. It should be noted that keys such as the audio recording key 15, the scanning key 21, and the recording time setting key 16 can be hardware keys. Otherwise, if the display 17 includes a touch panel, it is possible to implement those keys as software keys.

For example, a nonvolatile RAM (NVRAM) is used for the noise data memory (noise memory) 22, and noise data corresponding to noise surrounding the MFP 1 and operating noise of the MFP 1 etc. are collected and stored in the noise data memory 22 preliminarily as noise canceling data. The main CPU 2 reads the noise canceling data corresponding to noise included in the audio data sampled using the microphone 20 from the noise data memory 22 and reduces noise from the audio data by converting the read noise canceling data into antiphase data and multiplying the audio data by the converted antiphase data.

The noise data memory 22 can also store antiphase noise data as the noise canceling data. In this case, the main CPU 2 reduces noise by directly multiplying the audio data by the noise canceling data read from the noise data memory 22. Furthermore, if the operating noise is determined as noise, the noise data memory 22 stores operating noise in various operating modes (image processing operations) of the MFP 1 or antiphase operating noise. In this case, the main CPU 2 reads the noise canceling data corresponding to the operating mode (operating status) of the MFP 1 from the noise data memory 22. As a result, the main CPU 2 and the noise data memory 22 together function as an antiphase audio generator that generates antiphase audio of the noise, and the main CPU 2 functions as a noise reducer that reduces noise using the antiphase audio.

In addition, after the main CPU 2 converts the audio sampled by the microphone 20 into appropriate audio data using the CODEC 18 and stores the converted data in the audio data memory 19, the main CPU 2 performs an output process adding the stored data to the image data and transferring it to other terminals etc. In this case, the main CPU 2 performs an audio recording process that stores the audio data in the audio data memory 19 only if the noise included in the audio that the microphone 20 collects is equal to or less than a predetermined threshold. In addition, if the noise is larger than the threshold, the main CPU 2 performs a noise reduction process that reduces the noise at least equal to or less than the threshold and stores the processed data in the audio data memory 19. In addition, the main CPU 2 performs an audio recording method that adds the audio data stored in the audio data memory 19 to the image data. That is, if the noise is equal to or less than the threshold, the main CPU 2 adds the audio data from the microphone 20 to the image data directly. If the noise is larger than the threshold, the main CPU 2 performs the noise reduction process that reduces the noise included in the audio data and adds the processed data to the image data. As the noise reduction process, the main CPU 2 of the MFP 1 in this embodiment performs the noise reduction process that reduces noises by multiplying the audio data by the noise canceling data stored in the noise data memory 22 directly or multiplying the audio data by the antiphase noise canceling data.

Therefore, the main CPU 2 functions as an audio recording unit that stores the audio data in the audio data memory 19 as the audio memory. In addition, the main CPU 2 functions as a data editing unit that performs a data editing process that adds the audio data to the image data. Furthermore, the main CPU 2 functions as a controller that performs a control process that records audio only if the noise level included in the audio data collected by the microphone as the audio collecting unit is equal to or less than the predetermined threshold limit level.

Next, operation in this embodiment are described below. The MFP 1 in this embodiment improves efficiency of the image processing operation and suppresses operating noise from getting mixed in sampling audio.

The MFP 1 performs the audio recording process that converts operator's voice sampled using the microphone 20 into audio data, adds the converted data to the image data, and transfers the processed data to other terminals etc. The MFP 1 performs the image processing operation along with the audio recording process, while multiplying the noise canceling data that is antiphase of the noise sampled by the microphone 20 if noise is present.

Figure 3:
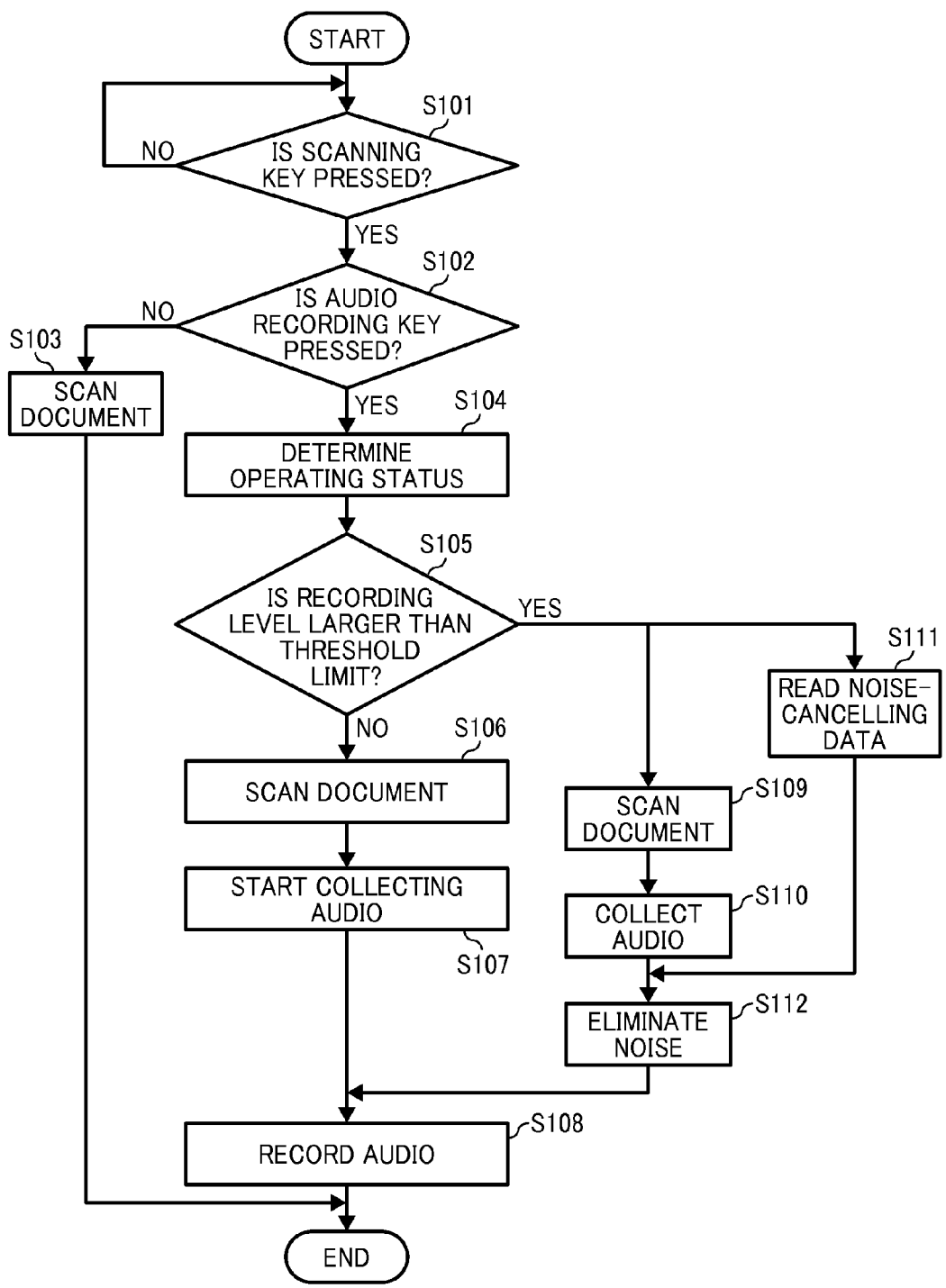
FIG. 3 is a flowchart illustrating an audio recording process as the first embodiment of the present invention.

That is, as shown in FIG. 3, in the MFP 1 in this embodiment, after the scanning key 21 is operated (pressed) in S101, the main CPU 2 checks whether or not the audio recording key 15 is operated (pressed) in S102.

In S102, if the audio recording key 15 is not operated (NO in S102), the main CPU 2 drives the image scanner 7 to scan a document. After finishing scanning all documents in S103, the process ends.

In S102, if the audio recording key 15 is operated (YES in S102), the main CPU 2 determines the operating status in S104. If the operating data or antiphase of the operating data is stored in the noise data memory 22 corresponding to the operating mode, the operating status corresponds to the operating mode (operating status) such as printing etc.

Next, the main CPU 2 checks whether or not the noise level is larger than the preset threshold in S105. For example, before the operator inputs voice, the main CPU 2 acquires the audio data that the microphone 20 collects, i.e., the environmental audio surrounding the MFP 1 (including the operating noise of the MFP 1 itself) as the noise and detects the environmental audio level as the noise level. In addition, the threshold limit is stored in the main ROM 3 etc. as an initial value preliminarily. Other than that, it is possible to input an allowable noise level included in the audio data using the control panel 6 etc. by user operation appropriately.

In S105, if the noise level is equal to or less than the threshold limit (NO in S105), the main CPU 2 drives the image scanner 7 to start scanning the preset documents in S106.

After starting scanning the document, main CPU 2 instructs the microphone 20 to collect the operator's voice in S107 and start recording audio storing the audio data of collected voice in the audio data memory 2 in S108. In recording the audio, it is possible that the main CPU 2 compresses data using the CODEC 18 and stores the compressed audio data in the audio data memory 19.

If a record finishing operation is performed using the audio recording key 15 by user operation or the recording time configured using the recording time setting key 16 elapses, the main CPU 2 finishes the recording process.

As a result, in this case, it is possible to scan the documents and record audio under the condition that the surrounding noise is equal to or less than the threshold limit.

In S105, if the noise level is larger than the threshold limit (YES in S105), the main CPU 2 drives the image scanner 7 to start scanning the preset documents in S109. After starting scanning the document, the main CPU 2 instructs the microphone 20 to collect the operator's voice in S110 and read the noise canceling data from the noise data memory 22 in S111. In this case, if the noise is mainly operational noise, the main CPU 2 reads the noise canceling data stored in the noise data memory 22 in accordance with the operating status acquired in S104.

The main CPU 2 performs the noise reduction process that reduces noise from the audio data collected by the microphone 20 using the noise canceling data in S112. The main CPU 2 reduces noise from the audio data by generating antiphase data and multiplying the audio data by the antiphase data if the noise canceling data is not antiphase noise data. If the noise canceling data is antiphase data, the main CPU 2 reduces noise from the audio data by multiplying the audio data collected by the microphone 20 by the antiphase noise canceling data as is.

The main CPU 2 starts an audio recording process storing the audio data that the noise is removed in the audio data memory 19 in S108.

If a record finishing operation is performed using the audio recording key 15 by user operation or the recording time configured using the recording time setting key 16 elapses, the main CPU 2 finishes the recording process.

As a result, in this case, it is also possible to scan the documents and record audio under the condition that the surrounding noise is equal to or less than the threshold limit.

As described above, the MFP 1 in this embodiment includes the microphone (audio collecting circuit) 20 that collects audio and outputs audio data, the main CPU (audio recording unit) 2 that stores the audio data in the audio data memory (audio storage unit) 19, the main CPU (data editing unit) 2 that adds the audio data to the image data, and the main CPU (controller) 2 that instructs the main CPU 2 as the audio recording unit to perform the audio recording operation only if the noise level included in the audio data collected by the microphone 20 is equal to or less than the predetermined threshold limit.

As a result, if the noise level is equal to or less than the threshold limit level, it is possible to record audio improving efficiency of the image processing operation and suppressing noise from getting mixed in recording audio without interrupting the operation of the MFP 1.

In addition, the MFP 1 in this embodiment includes a data output circuit such as the LAN I/F 9 that outputs the image data that the main CPU 2 as the data editing unit adds the audio data at a predetermined output method.

As a result, if the noise level is equal to or less than the threshold limit level, it is possible to record audio and output the image data that the audio is added improving efficiency of the image processing operation and suppressing noise from getting mixed in recording audio without interrupting the operation of the MFP 1.

In addition, the MFP 1 in this embodiment further includes the image scanner 7 that scans an image on the document and outputs the image data. If the noise level is equal to or less than the threshold limit level, the main CPU 2 as the controller performs the document scanning operation and the audio recording operation simultaneously.

As a result, if the noise level is equal to or less than the threshold limit level, it is possible to scan an image and record audio improving efficiency of the image processing operation and suppressing noise from getting mixed in recording audio without interrupting the operation of the MFP 1.

The MFP 1 in this embodiment further includes the noise data memory 22 and the main CPU 2 as the antiphase audio generator that generates the antiphase audio of the noise and the main CPU (noise reducer) 2 that reduces noise using the antiphase audio. If the noise level is larger than the threshold limit level, the main CPU 2 as the controller reduces the noise so that the noise becomes equal to or less than the threshold limit level and records the audio data that the noise is reduced in the audio data memory 19.

Therefore, if the noise exceeds the threshold limit level, it is possible to record audio after reducing the noise under the threshold limit level at least. As a result, it is possible to record audio without interrupting the operation of the MFP 1, enhancing efficiency of the image processing operation and suppressing operating noise from getting mixed in sampling audio.

Furthermore, in the MFP 1 in this embodiment, the antiphase audio generator described above includes the noise data memory (a noise memory) 22 that stores the noise and the main controller (an antiphase audio converting circuit) unit 2 that converts the noise into the antiphase audio.

Therefore, if the noise exceeds the threshold limit level, it is possible to record audio after reducing the noise under the threshold limit level at least easily. As a result, it is possible to record audio without interrupting the operation of the MFP 1, enhancing efficiency of the image processing operation and suppressing operating noise from getting mixed in sampling audio.

In addition, in the MFP 1 in this embodiment, the antiphase audio generator described above includes the noise data memory (an antiphase audio memory) 22 that stores antiphase audio of the noise.

Therefore, if the noise exceeds the threshold limit level, it is possible to record audio after reducing the noise under the threshold limit level at least easily and more efficiently. As a result, it is possible to record audio without interrupting the operation of the MFP 1, enhancing efficiency of the image processing operation and suppressing operating noise from getting mixed in sampling audio.

Furthermore, in the MFP 1 in this embodiment, the main CPU 2 as the noise reducer mixes the antiphase audio generated by the antiphase audio generator with the voice data collected by the microphone (an audio collecting circuit) 20 to reduce the noise included in the voice data.

Therefore, if the noise exceeds the threshold limit level, it is possible to record audio after reducing the noise under the threshold limit level at least easily and efficiently. As a result, it is possible to record audio without interrupting the operation of the MFP 1, enhancing efficiency of the image processing operation and suppressing operating noise from getting mixed in sampling audio.

Second Embodiment

Figure 4:
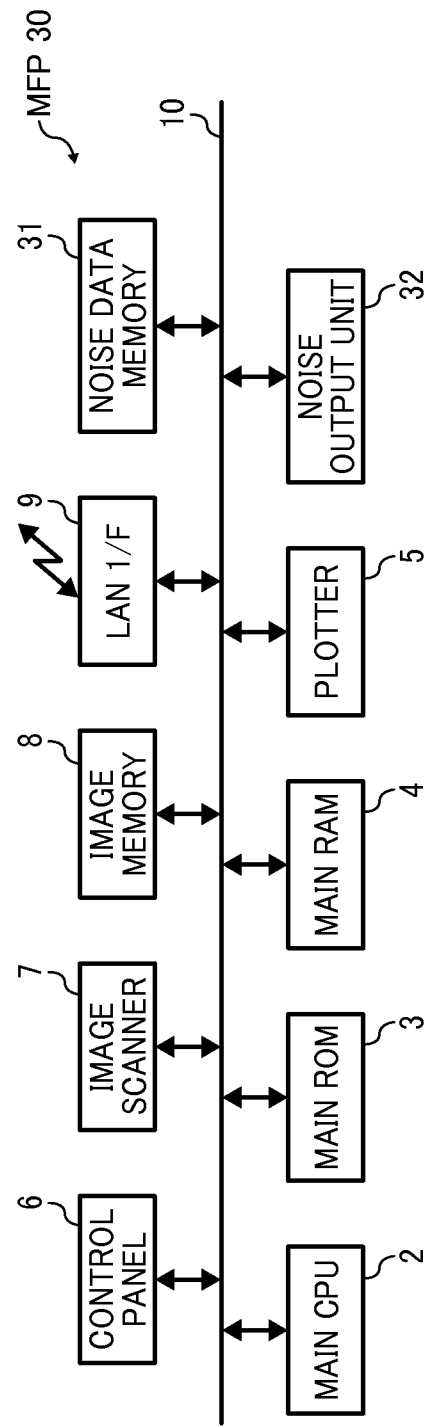
FIG. 4 is a block diagram illustrating a configuration of a MFP as a second embodiment of the present invention.

A second embodiment is described below with reference to FIGS. 4 and 5. FIG. 4 is a block diagram illustrating a configuration of a MFP 30 in this embodiment.

It should be noted that this embodiment is applied to a MFP similar to the MFP in the first embodiment described above. Therefore, in the description of this embodiment, same symbols are assigned to the same components as the MFP 1 in the first embodiment including not only the main unit of the MFP 1 but also the control panel 6 etc.

Just like the first embodiment, the MFP 30 in this embodiment includes the main CPU 2, the main ROM 3, the main RAM 4, the plotter 5, the control panel 6, the image scanner 7, the image memory 8, and the LAN I/F 9 etc., including the noise data memory 31 and the noise output unit 32 etc. In the MFP 30, units described above are connected with each other via a bus 10.

The control panel 6 has the similar configuration to the first embodiment. However, in this embodiment, it is unnecessary to include the noise data memory 22.

For example, a nonvolatile RAM (NVRAM) is used for the noise data memory (storage unit) 31, and noise data corresponding to noise surrounding the MFP 30 and operating noise of the MFP 30 etc. are collected and stored in the noise data memory 31 preliminarily as noise canceling data. The noise data memory 22 can also store antiphase noise data as the noise canceling data. If the operating noise is the noise, the noise data memory 22 stores operating noises in various operating mode (image processing operations) of the MFP 30 or antiphase operating noise as the noise canceling data.

For example, the noise output unit 32 consists of a speaker and an audio output circuit etc. and amplifies the noise canceling data stored in the noise data memory 31 in the state of antiphase audio of the noise to outside. That is, the noise output unit 32 amplifies the noise cancel audio.

Next, operation in this embodiment are described below. The MFP 30 in this embodiment improves efficiency of the image processing operation and suppresses operating noise from getting mixed in sampling audio by outputting the noise canceling audio antiphase of the noise by the noise output unit 32.

Figure 5:
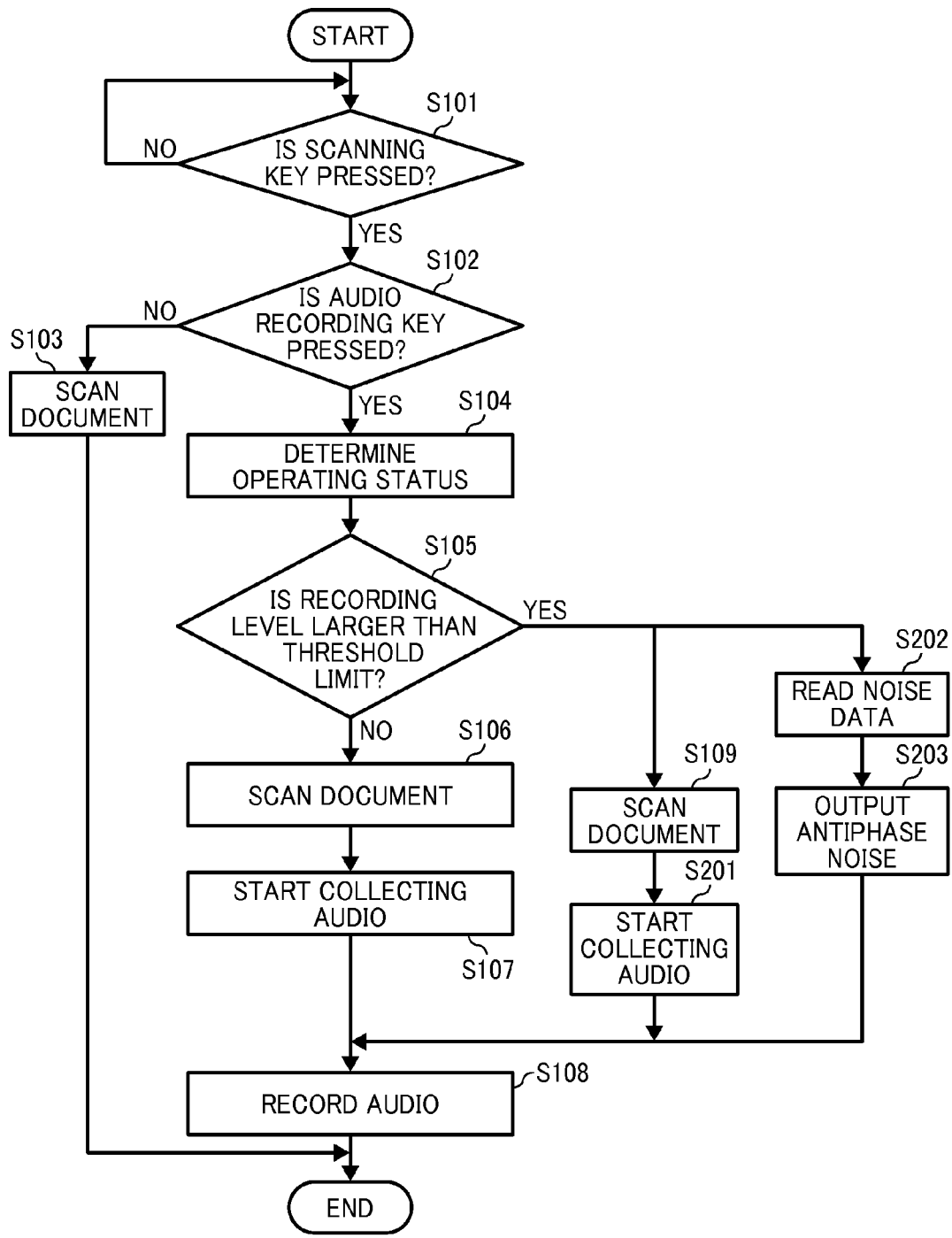
FIG. 5 is a flowchart illustrating an audio recording process as the second embodiment of the present invention.

The MFP 30 performs the audio recording process such as an audio added image data output process that converts operator's voice sampled using the microphone 20 into audio data, adds the converted data to the image data, and transfers the processed data to other terminals etc. under the control of the main CPU 2 as shown in FIG. 5. The MFP 30 ensures efficiency of the image processing operation and suppresses operating noise from getting mixed in sampling audio by performing the image processing operation along with the audio recording process outputting the noise canceling audio antiphase of the noise by the noise output unit 32. In FIG. 5, same symbols are assigned to steps similar to steps in FIG. 3, and those descriptions are simplified.

After the scanning key 21 is operated (pressed) in S101, the main CPU 2 checks whether or not the audio recording key is operated (pressed) in S102.

In S102, if the audio recording key 15 is not operated (NO in S102), the main CPU 2 drives the image scanner 7 to scan a document. After finishing scanning all documents in S103, the process ends.

In S102, if the audio recording key 15 is operated (YES in S102), the main CPU 2 determines the operating status in S104 to check whether or not the noise level is larger than the predetermined threshold limit in S105.

In S105, if the noise level is equal to or less than the threshold limit (NO in S105), the main CPU 2 drives the image scanner 7 to start scanning the preset documents in S106. After starting scanning the document, main CPU 2 instructs the microphone 20 to collect the operator's voice in S107 and start recording audio storing the audio data of collected voice in the audio data memory 2 in S108.

If a record finishing operation is performed using the audio recording key 15 by user operation or the recording time configured using the recording time setting key 16 elapses, the main CPU 2 finishes the recording process.

As a result, in this case, it is possible to scan the documents and record audio under the condition that the surrounding noise is equal to or less than the threshold limit.

In S105, if the noise level is larger than the threshold limit (YES in S105), the main CPU 2 drives the image scanner 7 to start scanning the preset documents in S109. After starting scanning the document, the main CPU 2 instructs the microphone 20 to collect the operator's voice in S201 and read the noise canceling data from the noise data memory 31 in S202. In this case, if the noise is mainly operational noise, the main CPU 2 reads the noise canceling data stored in the noise data memory 31 in accordance with the operating status acquired in S104.

The main CPU 2 instructs the noise output unit 32 to output the noise canceling data, the noise canceling audio antiphase of the noise, and instructs the microphone 20 to collect the voice data under the condition of reducing the noise in S203 and S201. That is, if the noise canceling data is not antiphase audio data, the main CPU 2 generates antiphase data and amplifies the antiphase noise canceling audio using the noise output unit 32. If the noise canceling data is antiphase audio data, the main CPU 2 amplifies the antiphase noise canceling audio using the noise output unit 32. If the antiphase noise canceling audio is output, the noise is canceled by the output noise canceling audio, and the noise canceled-voice is collected by the microphone 20 as the audio data.

The main CPU 2 starts an audio recording process storing the audio data that the noise is reduced in the audio data memory 19 in S108.

If a record finishing operation is performed using the audio recording key 15 by user operation or the recording time configured using the recording time setting key 16 elapses, the main CPU 2 finishes the recording process.

As a result, in this case, it is also possible to scan the documents and record audio under the condition that the surrounding noise is equal to or less than the threshold limit.

As described above, in the MFP 30 in this embodiment, the main CPU 2 and the noise output unit 32 as the noise reducer amplifies the antiphase audio generated by the antiphase audio generator to the outside to reduce the noise included in the voice data collected by the microphone (an audio collecting unit) 20. That is, the main CPU 2 reads the noise canceling data stored in the noise data memory 31 and outputs it as the noise canceling audio using the noise output unit 32 to reduce noise from the audio collected by the microphone 20.

As a result, when the microphone 20 collects audio, it is possible to reduce the noise under the threshold limit, and it is possible to record the audio whose noise is reduced under the threshold limit level at least. As a result, it is possible to record audio without interrupting the operation of the MFP 1, enhancing efficiency of the image processing operation and suppressing operating noise from getting mixed in sampling audio.

Third Embodiment

Figure 6:
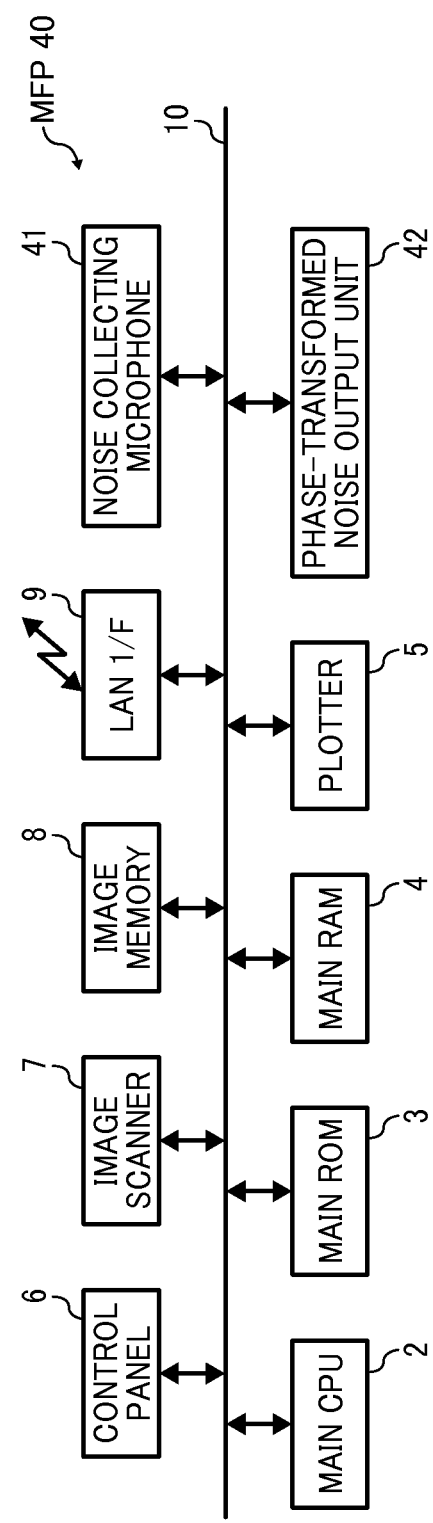
FIG. 6 is a block diagram illustrating a configuration of a MFP as a third embodiment of the present invention.

A third embodiment is described below with reference to FIGS. 6 and 7. FIG. 6 is a block diagram illustrating a configuration of a MFP 40 in this embodiment.

It should be noted that this embodiment is applied to a MFP similar to the MFP in the first embodiment described above. Therefore, in the description of this embodiment, same symbols are assigned to the same components as the MFP 1 in the first embodiment including not only the main unit of the MFP 1 but also the control panel 6 etc.

Just like the first embodiment, the MFP 40 in this embodiment includes the main CPU 2, the main ROM 3, the main RAM 4, the plotter 5, the control panel 6, the image scanner 7, the image memory 8, and the LAN I/F 9 etc., including a noise collecting microphone 41 and a phase-transformed noise output unit 42 etc. In the MFP 40, units described above are connected with each other via a bus 10.

The control panel 6 has the similar configuration to the first embodiment. However, in this embodiment, it is unnecessary to include the noise data memory 22.

The noise collecting microphone (a noise collecting unit) 41 includes a microphone and an amplifier circuit etc. to sample external audio, especially surrounding noise in sampling operator's voice.

The phase-transformed noise output unit 42 includes a phase transformation circuit, a speaker, and an amplifier circuit etc. to convert the noise collected by the noise collecting microphone 41 into antiphase noise, to generate phase-transformed noise canceling audio, and to amplify it.

Next, workings in this embodiment are described below. The MFP 40 in this embodiment ensures efficiency of the image processing operation and suppresses operating noise from getting mixed in sampling audio by collecting noise in sampling the audio and outputting noise canceling audio antiphase of the noise.

Figure 7:
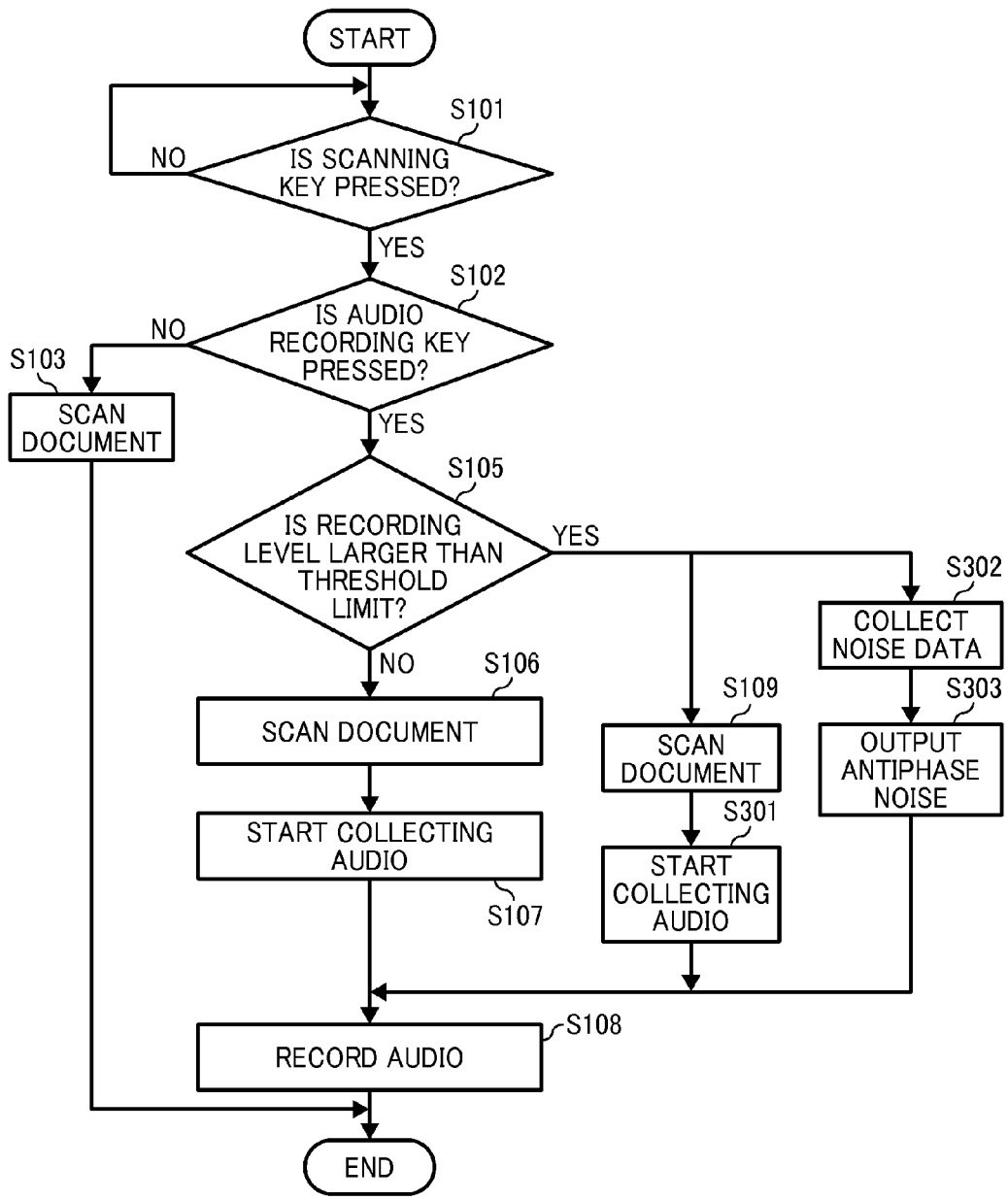
FIG. 7 is a flowchart illustrating an audio recording process as the third embodiment of the present invention.

The MFP 40 performs the audio recording process that converts operator's voice sampled using the microphone 20 into audio data, adds the converted data to the image data, and transfers the processed data to other terminals etc. under the control of the main CPU 2 as shown in FIG. 7. The MFP 40 performs the image processing operation along with the audio recording process improving efficiency of the image processing operation and suppressing operating noise from getting mixed in sampling audio by collecting noise in sampling the audio and outputting noise canceling audio antiphase of the noise. In FIG. 7, same symbols are assigned to steps similar to steps in FIG. 3, and those descriptions are simplified.

After the scanning key 21 is operated (pressed) in S101, the main CPU 2 checks whether or not the audio recording key is operated (pressed) in S102.

In S102, if the audio recording key 15 is not operated (NO in S102), the main CPU 2 drives the image scanner 7 to scan a document. After finishing scanning all documents in S103, the process ends.

In S102, if the audio recording key 15 is operated (YES in S102), the main CPU 2 determines the operating status in S104 to check whether or not the noise level is larger than the predetermined threshold limit in S105.

In S105, if the noise level is equal to or less than the threshold limit (NO in S105), the main CPU 2 drives the image scanner 7 to start scanning the preset documents in S106.

After starting scanning the document, main CPU 2 instructs the microphone 20 to collect the operator's voice in S107 and start recording audio storing the audio data of collected voice in the audio data memory 2 in S108.

If a record finishing operation is performed using the audio recording key 15 by user operation or the recording time configured using the recording time setting key 16 elapses, the main CPU 2 finishes the recording process.

As a result, in this case, it is possible to scan the documents and record audio under the condition that the surrounding noise is equal to or less than the threshold limit.

In S105, if the noise level is larger than the threshold limit (YES in S105), the main CPU 2 drives the image scanner 7 to start scanning the preset documents in S109. After scanning the documents, the main CPU 2 instructs the microphone 20 to collect the operator's voice in S301 and instructs the noise collecting microphone 41 to start collecting noise data in S302.

The main CPU 2 instructs the phase-converted noise output unit 42 to convert the noise data into antiphase noise and instructs to output the phase-converted audio as the noise canceling audio in S303.

The main CPU 2 outputs the noise canceling audio antiphase of the noise using the phase-converted noise output unit 42 and instructs the microphone 20 to collect the voice whose noise is reduced by the noise canceling audio in S303 and S301. That is, the main CPU 2 amplifies the noise canceling audio antiphase of the noise collected by the noise collecting microphone 41 using the phase-converted noise output unit 42 and instructs the microphone 20 to collect the voice whose noise is reduced by the noise canceling audio.

The main CPU 2 starts an audio recording process storing the audio data that the noise is removed in the audio data memory 19 in S108.

If a record finishing operation is performed using the audio recording key 15 by user operation or the recording time configured using the recording time setting key 16 elapses, the main CPU 2 finishes the recording process.

As a result, in this case, it is also possible to scan the documents and record audio under the condition that the surrounding noise is equal to or less than the threshold limit.

As described above, in the MFP 40 in this embodiment, the antiphase audio generator includes a noise collecting microphone (noise collection unit) 41 that collects external noise and the phase-converted noise output unit (antiphase audio converting circuit) 42 that converts the noise collected by the noise collecting microphone 41 into antiphase audio.

As a result, by generating audio antiphase of external noise in recording audio, it is possible to reduce the noise more efficiently and appropriately. As a result, it is possible to scan documents and record audio without interrupting the operation of the MFP 40, enhancing efficiency of the image processing operation and suppressing operating noise from getting mixed in sampling audio.

Numerous additional modifications and variations are possible in light of the above teachings. It is therefore to be understood that, within the scope of the appended claims, the disclosure of this patent specification may be practiced otherwise than as specifically described herein.

The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. The hardware platform includes any desired kind of hardware resources including, for example, a central processing unit (CPU), a random access memory (RAM), and a hard disk drive (HDD). It is also possible to download the program from an external apparatus that includes a storage medium storing the program or stores the program in a storage unit and install the program in the computer to execute the program. The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

The invention claimed is:

1. An image processing apparatus comprising:
   a plotter configured to output a printable image contained in first image data to a recording medium;
   a scanner configured to scan the recording medium at a set resolution to generate second image data;
   a control panel configured to receive input from an operator to control the plotter and the scanner; and
   circuitry configured to,
      obtain audio data from audio collected through a microphone,
      determine whether the audio data has a noise level equal to or less than a threshold to generate a determination result,
      selectively record the audio data when the determination result indicates that the noise level of the audio data is equal to or less than the threshold, and
      add the recorded audio data to image data, the image data being one or more of the first image data and the second image data.

2. The image processing apparatus according to claim 1, further comprising:
   a data output interface to output the image data to which the audio data is added.

3. The image processing apparatus according to claim 2, wherein the circuitry instructs the scanner to scan the recording medium while recording the audio simultaneously with the microphone if the noise level is less than the threshold.

4. The image processing apparatus according to claim 1, wherein, when the circuitry determines that the noise level of the audio data is greater than the threshold, the circuitry is further configured to,
   obtain antiphase audio of noise,
   reduce the noise of the audio data using the antiphase audio to be equal to or less than the threshold, and
   record the audio data from which the noise is reduced.

5. The image processing apparatus according to claim 4, further comprising:
   a memory to store the noise, wherein
      the circuitry converts the noise into the antiphase audio of the noise.

6. The image processing apparatus according to claim 4, further comprising:
   a memory to store the antiphase audio of the noise.

7. The image processing apparatus according to claim 4, wherein the circuitry is configured to,
   collect external noise, and
   convert the external noise into the antiphase audio of the noise.

8. The image processing apparatus according to claim 4, wherein the circuitry is configured to mix the antiphase audio of the noise with the audio data collected through the microphone so as to have the audio data having the noise level equal to or less than the threshold.

9. The image processing apparatus according to claim 4, wherein the circuitry amplifies the antiphase audio of the noise.

10. The image processing apparatus according to claim 4, further comprising:
    a memory configured to store noise cancelling data corresponding to the noise such that the noise cancelling data includes information on canceling operating noise generated by the image processing apparatus.

11. The image processing apparatus according to claim 1, wherein the noise level is a level of operating noise of the image processing apparatus.

12. The image processing apparatus according to claim 1, wherein the control panel comprises:
    the microphone, the microphone configured to collect the audio based on instructions received from circuitry, the audio including a voice of the operator; and
    a speaker configured to output the audio data based on instructions received from the circuitry.

13. The image processing apparatus according to claim 1, wherein the circuitry is configured to set a recording time for recording the audio data based on the input from the operator via the control panel.

14. The image processing apparatus according to claim 1, wherein the circuitry is configured to selectively record the audio data such that the circuitry is configured to,
    record the audio data without performing noise cancellation thereon only if the noise level of the audio data is equal to or less than the threshold; and
    if the noise level of the audio data is greater than the threshold,
        perform noise cancellation on the audio data to generate noise reduced audio data, and
        record the noise reduced audio data, only if the noise level of the noise reduced audio data is equal to or less than the threshold.

15. A method of recording audio performed by an image processing apparatus, the image processing apparatus including a plotter configured to output a printable image contained in first image data to a recording medium, a scanner configured to scan the recording medium at a set resolution to generate second image data, and a control panel configured to receive input from a user to control the plotter and the scanner, the method comprising:
    obtaining audio data collected through a microphone;
    determining whether the audio data has a noise level equal to or less than a threshold to generate a determination result
    selectively recording the audio data when the determination result indicates that the noise level of the audio data is equal to or less than the threshold; and
    adding the recorded audio data to image data, the image data being one or more of the first image data and the second image data.

16. A non-transitory, computer-readable recording medium storing a program that, when executed by one or more processors of an image processing apparatus including a plotter configured to output a printable image contained in first image data to a recording medium, a scanner configured to scan the recording medium at a set resolution to generate second image data, and a control panel configured to receive input from a user to control the plotter and the scanner, causes the processors to implement a method of recording audio comprising:

obtaining audio data collected through a microphone;

determining whether the audio data has a noise level equal to or less than a threshold to generate a determination result selectively recording the audio data when the determination result indicates that the noise level of the audio data is equal to or less than the threshold; and adding the recorded audio data to image data, the image data being one or more of the first image data and the second image data.

* * * * *